(12) United States Patent
Lee et al.

(10) Patent No.: US 9,319,749 B2
(45) Date of Patent: Apr. 19, 2016

(54) METHOD OF DISPLAYING IMAGE BY USING REMOTE CONTROLLER AND APPARATUS PERFORMING THE SAME

(71) Applicant: Samsung Electronics Co., Ltd., Suwon-si, Gyeonggi-do (KR)

(72) Inventors: Seung-woon Lee, Suwon-si (KR); Deuk-hyoung Park, Suwon-si (KR); Seon-hoe Heo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/739,630

(22) Filed: Jun. 15, 2015

(65) Prior Publication Data
US 2015/0382072 A1 Dec. 31, 2015

(30) Foreign Application Priority Data
Jun. 27, 2014 (KR) .................. 10-2014-0079950

(51) Int. Cl.
| | |
|---|---|
| *H04N 5/445* | (2011.01) |
| *H04N 5/45* | (2011.01) |
| *H04N 5/50* | (2006.01) |
| *H04N 21/485* | (2011.01) |
| *H04N 5/44* | (2011.01) |

(52) U.S. Cl.
CPC ......... *H04N 21/4858* (2013.01); *H04N 5/4403* (2013.01)

(58) Field of Classification Search
CPC ..... H04N 5/45; H04N 5/445; H04N 5/44591; H04N 5/4403; H04N 21/4858; H04N 21/4316; G09G 5/14
USPC ................ 348/563–565, 569, 576, 580, 581; 345/620, 629, 635, 638
IPC ........................... H04N 5/445, 5/45, 5/50, 9/74
See application file for complete search history.

(56) References Cited

U.S. PATENT DOCUMENTS

| | | | |
|---|---|---|---|
| 2004/0150659 A1 * | 8/2004 | Nakano | G06F 3/14 345/629 |
| 2006/0061705 A1 * | 3/2006 | Onishi | G02B 6/0046 349/62 |
| 2012/0192231 A1 | 7/2012 | Maa | |

* cited by examiner

*Primary Examiner* — Sherrie Hsia
(74) *Attorney, Agent, or Firm* — Jefferson IP Law, LLP

(57) ABSTRACT

An image display method is provided. The image display method includes displaying a plurality of images on a screen that includes a plurality of sub-screens, displaying a first indicator indicating a first point located at a boundary of the plurality of the sub-screens, displaying second indicators on a plurality of second points which are different from the first point, receiving an input selecting one of the second indicators, and moving a boundary at which the first point is located, so that the first point is located at a second point corresponding to the selected second indicator.

20 Claims, 20 Drawing Sheets

METHOD OF DISPLAYING IMAGE BY USING REMOTE CONTROLLER AND APPARATUS PERFORMING THE SAME

CROSS-REFERENCE TO RELATED APPLICATION(S)

This application claims the benefit under 35 U.S.C. §119(a) of a Korean patent application filed on Jun. 27, 2014 in the Korean Intellectual Property Office and assigned Serial No. 10-2014-0079950, the entire disclosure of which is hereby incorporated by reference.

TECHNICAL FIELD

The present disclosure relates to a method of changing an area, in which an image is displayed, by using a remote controller and an apparatus performing the same.

BACKGROUND

As technologies have advanced, the screen of a display apparatus, such as a television (TV), has become large. Based on the large size, a display apparatus may have a picture-in-picture function performed by dividing the screen into several sub-screens or a picture-by-picture function performed by setting an additional small-sized screen on the whole screen, so as to display several images at the same time.

To support such a picture-in-picture function, a user interface is provided for controlling a display area of a plurality of images displayed at the same time. However, since complicated operations are necessary to control the picture-in-picture function for such a display apparatus, such as the selection of one of many keys so as to select one of the plurality of images and to control a display area of the selected image, a user may feel difficulty in learning to use the display apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of changing a display area of a plurality of images, displayed on a display apparatus, and an apparatus performing the same.

In accordance with an aspect of the present disclosure, an image display method is provided. The image display method includes displaying a plurality of images on a screen that includes a plurality of sub-screens, displaying a first indicator indicating a first point located at a boundary of the plurality of the sub-screens, displaying second indicators on a plurality of second points which are different from the first point, receiving an input selecting one of the second indicators, and moving a boundary at which the first point is located, so that the first point is located at a second point corresponding to the selected second indicator.

The image display method may further include adjusting a size of the plurality of the images, based on the moved boundary.

The image display method may further include changing positions of the plurality of the second points, based on a position of the first point located at the moved boundary and displaying the second indicators on the plurality of the changed second points.

The second indicators may be numbers which are different from each other and indicate the plurality of the second points.

The displaying of the second indicators may include displaying the numbers which are different from each other, in a same array as an array of number keys on a remote controller, and the receiving of the input selecting one of the second indicators may include receiving a number from the remote controller.

The first point may be a crossing point at which boundaries of the plurality of the sub-screens cross each other.

The image display method may further include receiving an input selecting the first indicator, determining a type of the received input, and deleting the first indicator and the second indicators which are displayed on the screen, based on the type of the received input.

The image display method may further include receiving an input selecting the first indicator, determining a type of the received input, and adjusting a size of the plurality of the sub-screens based on the type of the received input, so that sizes of each of the plurality of the sub-screens are identical to each other.

In accordance with another aspect of the present disclosure, an image display method is provided. The image display method includes displaying a plurality of images on a screen that includes a plurality of sub-screens, displaying a plurality of indicators on a plurality of points on the screen, receiving an input selecting one of the plurality of the indicators, determining a location of a point corresponding to the selected indicator, and exchanging images displayed on the plurality of the sub-screens with each other or enlarging one of the plurality of the sub-screens to the whole screen, selectively based on the location of the point corresponding to the selected indicator.

The exchanging of the images displayed on the plurality of the sub-screens with each other or the enlarging of one of the plurality of the sub-screens to the whole screen may include, if a point corresponding to the selected indicator is located at a boundary of the plurality of the sub-screens, exchanging images, displayed on sub-screens that are differentiated by the boundary at which the point corresponding to the selected indicator is located, with each other.

The exchanging of the images displayed on the plurality of the sub-screens with each other or the enlarging of one of the plurality of the sub-screens to the whole screen may include, if a point corresponding to the selected indicator is located in one of the plurality of the sub-screens, enlarging the sub-screen in which the point corresponding to the selected indicator is located to the whole screen.

In accordance with another aspect of the present disclosure, a display apparatus is provided. The display apparatus includes a display unit configured to display a plurality of images on a screen that includes a plurality of sub-screens, display a first indicator indicating a first point located at a boundary of the plurality of the sub-screens, and display second indicators on a plurality of second points which are different from the first point, an input unit configured to receive an input of selecting one of the second indicators, and a control unit configured to move a boundary at which the first point is located, so that the first point is located at a second point corresponding to the selected second indicator.

The control unit may adjust a size of the plurality of the images, based on the moved boundary.

The control unit may change positions of the plurality of the second points, based on a position of the first point located at the moved boundary, and display the second indicators on the plurality of the changed second points.

The display unit may the second indicators, and displays the numbers which are different from each other, in a same array as an array of number keys on a remote controller, and the user input unit may an input selecting one of the second indicators, and receives a number from the remote controller.

The user input unit may receive an input corresponding to the first indicator, the control unit may determine a type of the received input, and the display unit may delete the first indicator and the second indicators which are displayed on the screen, based on the type of the received input.

The user input unit may receive an input corresponding to the first indicator, the control unit may determine a type of the received input, and the display unit may adjust a size of the plurality of the sub-screens based on the type of the received input, so that sizes of the plurality of the sub-screens are identical to each other.

In accordance with another aspect of the present disclosure, a display apparatus is provided. The display apparatus includes a display unit configured to display a plurality of images on a screen that includes a plurality of sub-screens, and display a plurality of indicators on a plurality of points on the screen, a user input unit configured to receive an input of selecting one of the plurality of the indicators, and a control unit configured to determine a location of a point corresponding to the selected indicator, and exchange each image displayed on the plurality of the sub-screens with each other or enlarging one of the plurality of the sub-screens to the whole screen, selectively based on the location of the point corresponding to the selected indicator.

If a point corresponding to the selected indicator is located in one of the plurality of the sub-screens, the control unit may enlarge the sub-screen in which the point corresponding to the selected indicator is located to the whole screen.

In accordance with another aspect of the present disclosure, a non-transitory computer-readable recording storage medium is provided. The non-transitory computer-readable recording storage medium has stored thereon a computer program, which when executed by a computer, performs the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
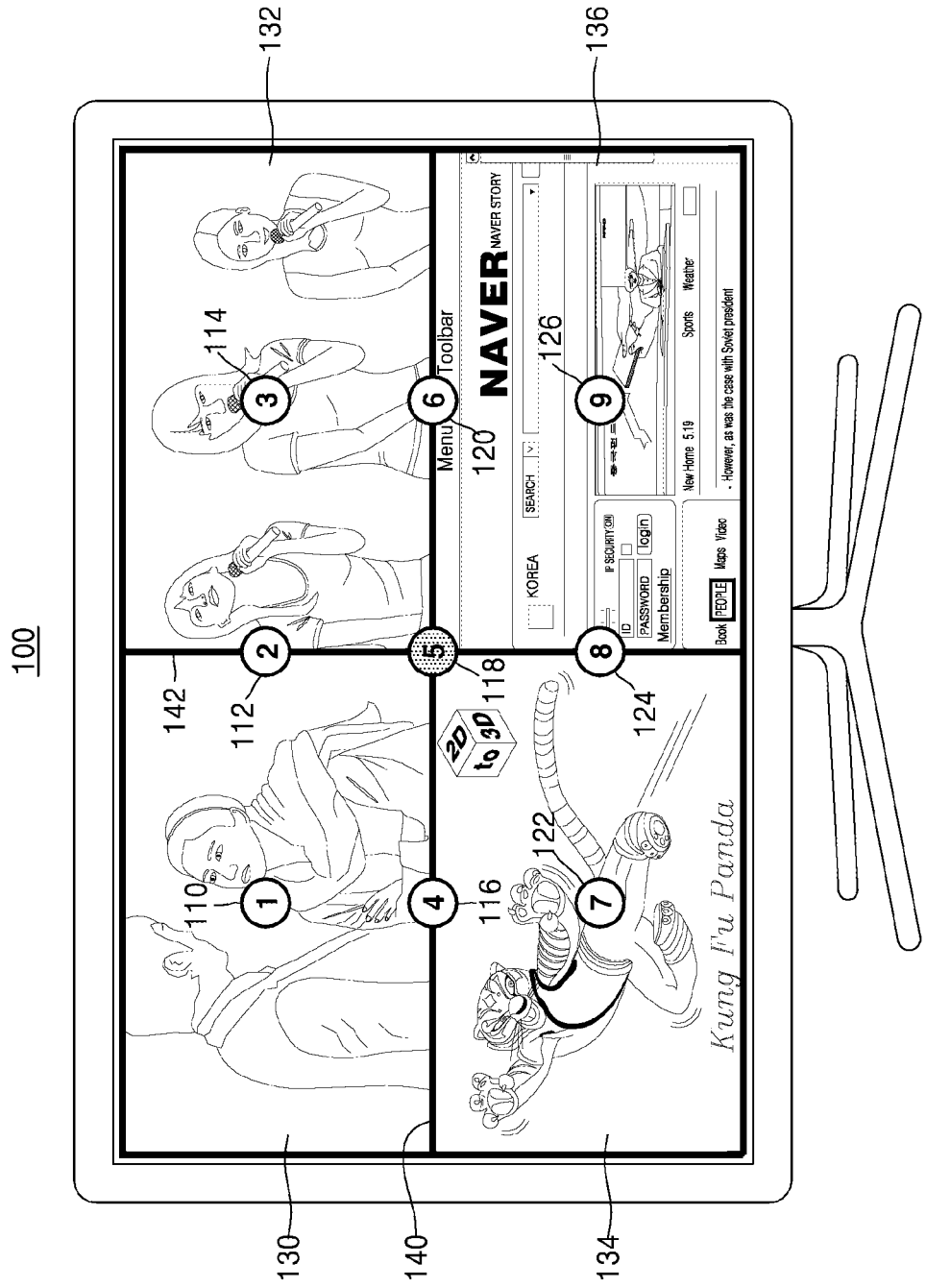
FIGS. 1A and 1B illustrate a user interface for changing a display area of a plurality of images displayed on a screen of a display apparatus according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein will be briefly described, and various embodiments of the present disclosure will be described in detail below.

General and widely-used terms have been employed herein, in consideration of functions provided in the present disclosure, and may vary according to an intention of one of ordinary skill in the art, a precedent, or emergence of new technologies. Additionally, in some cases, the disclosure may arbitrarily select and use specific terms. If so, the disclosure will include the meaning of the terms in the description. Accordingly, it will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, terms used herein, such as 'unit' or 'module', mean entities for processing at least one function or operation. These entities may be implemented by hardware, software, or a combination of hardware and software.

The present disclosure will now be described more fully with reference to the accompanying drawings, in which various embodiments of the present disclosure are shown. The present disclosure may, however, be embodied in many different forms and should not be construed as being limited to the embodiments set forth herein. In the description of the present disclosure, certain detailed explanations of the related art are omitted when it is deemed that they may unnecessarily obscure the essence of the present disclosure.

Figure 1B:
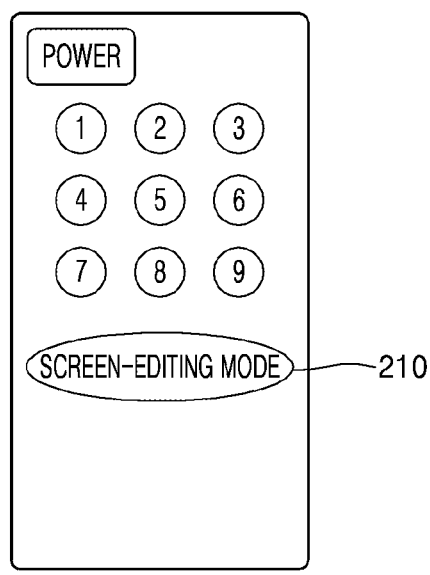

FIGS. 1A and 1B illustrate a user interface for changing a display area of a plurality of images displayed on a screen of a display apparatus according to various embodiments of the present disclosure.

A display apparatus may display a plurality of images at the same time. The display apparatus may divide a screen into a plurality of sub-screens, and display an image on each of the plurality of sub-screens obtained by the dividing. Additionally, the display apparatus may set a separate screen having a small size on a whole screen, and display a different image on the separate screen from an image on the whole screen.

Referring to FIGS. 1A and 1B, a display apparatus 100 may divide the whole screen of the display apparatus 100 into a plurality of sub-screens. For example, the display apparatus 100 may divide the whole screen of the display apparatus 100 into 4 sub-screens. Of course, this is merely an example and it should be understood that the display apparatus 100 may divide the whole screen of the display apparatus 100 into any number of sub-screens.

The display apparatus 100 may display an image on each sub-screen obtained by the dividing. For example, the display apparatus 100 may receive moving images for soap opera content and moving images for news content from a broadcasting channel, and thus, display the moving images for the soap opera on an upper-left sub-screen 130 and the moving images for the news on an upper-right sub-screen 132. The display apparatus 100 may also receive moving images for a movie from a content service provider and play the movie on a lower-left sub-screen 134. Additionally, the display apparatus 130 may receive a webpage through the Internet, and display the received webpage on a lower-right sub-screen 136.

The display apparatus 100 may receive a control signal for controlling the display apparatus 100 from a remote controller 200. For example, the display apparatus 100 may receive an identification value of a key pushed or otherwise input by a user, for example, a number key, a screen-editing mode key 210, or a menu button and an identification value of an input type, for example, a click or a double click from the remote controller 200. In the display apparatus 100, an operation to be performed by the display apparatus 100 may be preset in correspondence with an identification value of a key or an identification value of an input type with respect to the remote controller 200.

The remote controller 200 may be any of various types such a remote control, a cellular phone, a smartphone, a laptop computer, a tablet personal computer (PC), an electronic terminal, a digital broadcasting terminal, a personal digital assistant (PDA), a portable multimedia player (PMP), a moving pictures expert group audio layer 3 (MP3) player, a digital camera, or a navigation device.

According to an embodiment of the present disclosure, the display apparatus 100 may display a user interface for changing a display area of a plurality of images on a screen of the display apparatus 100.

The user interface for changing a display area of the plurality of the images may include a first indicator indicating a first point 118 that is a reference for changing a display area of the plurality of the images.

The first point 118 may be located at a crossing point at which boundaries of the plurality of the sub-screens cross each other, at a center point of boundaries 140 and 142 at which the plurality of the sub-screens contact each other, or at a corner of the plurality of sub-screens, but is not limited thereto.

Additionally, the first indicator indicating the first point 118 may be a figure, for example, in the shape of a point. Additionally, the first indicator may be a preset number, or may be one of each identification value of keys on the remote controller 200, but is not limited thereto.

Also, a user interface for changing a display area of the plurality of images is a point to which the first point 118 is to be moved, and may include second indicators indicating a plurality of second points 110, 112, 114, 116, 120, 122, 124, and 126 that may be selected by a user.

The plurality of the second points 110, 112, 114, 116, 120, 122, 124, and 126 may be located at a center point of a sub-screen, a center point of a boundary of a sub-screen, or a center point of the boundaries 140 and 142 at which the plurality of the sub-screens 130, 132, 134, and 136 contact each other. However, a location of the plurality of the second points 110, 112, 114, 116, 120, 122, 124, and 126 is not limited thereto. In the description of the specification, the plurality of the second points 110, 112, 114, 116, 120, 122, 124, and 126 may be referred to as an auxiliary point.

Additionally, the plurality of the second points 110, 112, 114, 116, 120, 122, 124, and 126 may be figures having a shape of a point. Additionally, the second indicators may be respectively a preset number, or one of each identification value of keys on in the remote controller 200, but is not limited thereto.

According to an embodiment of the present disclosure, the second indicators may be displayed in a same array as an array of keys on the remote controller 200.

For example, as shown in FIG. 1B, an array of number keys on the remote controller 200 may be formed to include 1 to 3 in a first row, 4 to 6 in a second row, and 7 to 9 in a third row. Accordingly, if the second indicators are numbers, the display apparatus 100 may display the second indicators in the array formed of 1 to 3 in the first row, 4 to 6 in the second row, and 7 to 9 in the third row.

According to an embodiment of the present disclosure, the display apparatus 100 may change a display area of an image displayed on the screen, by receiving an identification value of a key from the remote controller 200. Additionally, the display apparatus 100 may change an area of the plurality of the sub-screens, by receiving an identification value of a key selected by the remote controller 200. In this case, the display apparatus 100 may change a display area of an image displayed on the screen, by changing the area of the plurality of the sub-screens. Additionally, the display apparatus 100 may exchange images displayed on the plurality of the sub-screens with each other, based on the identification value of the key received from the remote controller 200. Additionally, the display apparatus 100 may enlarge a selected sub-screen to a whole screen, based on the identification value of the key received from the remote controller 200. Hereinafter, this embodiment of the present disclosure is described in more detail with reference to drawings.

Figure 2:
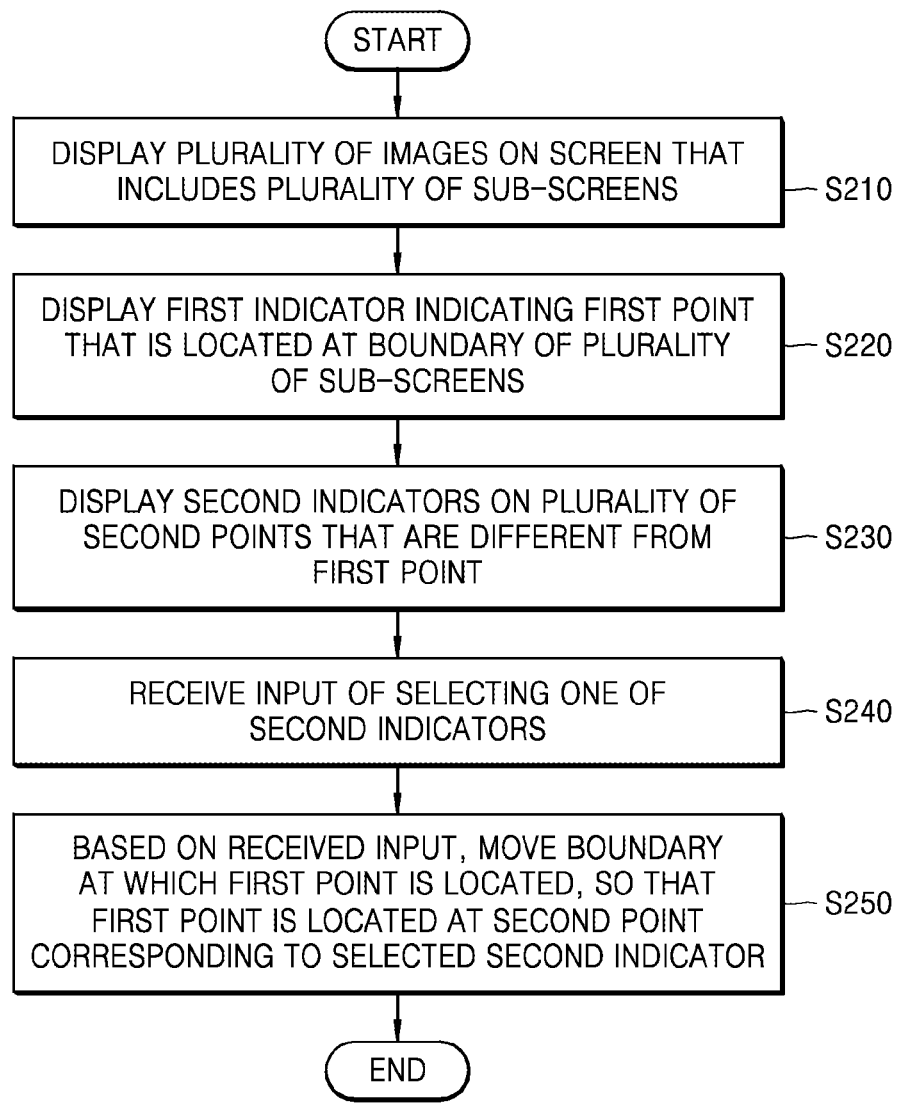
FIG. 2 is a flowchart of a method of changing a display area of a plurality of images displayed on a screen of a display apparatus, by using a remote controller, according to an embodiment of the present disclosure.

FIG. 2 is a flowchart of a method of changing a display area of a plurality of images displayed on a screen of a display apparatus, by using a remote controller, according to an embodiment of the present disclosure.

Referring to FIG. 2, the display apparatus 100 may display a plurality of images on the screen that includes a plurality of sub-screens in operation S210.

The display apparatus 100 may divide a whole screen into the plurality of the sub-screens, based on a user input. The number and arrangement of the sub-screens obtained by the dividing may be selected by a user.

Additionally, the display apparatus 100 may display an image on each sub-screen. For example, the display apparatus 100 may receive broadcasting data from various broadcasting channels, and output the broadcasting data to each sub-screen. Additionally, the display apparatus 100 may execute one application on one sub-screen. For example, the display apparatus 100 may execute a web browser application on one sub-screen.

In operation S220, the display apparatus 100 may display a first indicator indicating the first point 118, located at a boundary between the plurality of the sub-screens, on the screen.

If the display apparatus 100 enters a screen-editing mode for changing a display area of the plurality of the images, the display apparatus 100 may display a user interface for changing the display area of the plurality of the images.

If the display apparatus 100 receives identification information of a key (e.g., screen-editing mode key 210) for entering the screen-editing mode from the remote controller 200, the display apparatus 100 may enter the screen-editing mode. If the display apparatus 100 receives a user input of selecting a screen-editing menu displayed on a screen, the display apparatus 100 may also enter the screen-editing mode.

If the display apparatus 100 enters the screen-editing mode, the display apparatus 100 may determine the first point 118, according to a state where a screen is divided at a point of time when the display apparatus 100 enters the screen-editing mode. In the display apparatus 100, a method of determining the first point 118 according to a state where a screen is divided may be preset. For example, if the whole screen is divided into 4 sub-screens, the first point 118 may be a point at which boundaries of the 4 sub-screens cross each other. If the whole screen is divided into 2 sub-screens, the first point 118 may be a center point of a boundary at which two sub-screens contact each other. The first point 118 may also be located at a crossing point at which boundaries of the plurality of the sub-screens cross each other, a center point of a boundary at which a plurality of sub-screens contact each other, or a corner of a sub-screen, but a location of the first point 118 is not limited thereto.

As the first point 118 is selected, the display apparatus 100 may display the first indicator on a location of the first point 118. A shape of the first indicator may be preset for the display apparatus 100. For example, the first indicator indicating the first point 118 may be a figure in the shape of a point. Additionally, the first indicator may be a preset number or one of respective identification values of keys on the remote controller 200, but is not limited thereto.

In operation S230, the display apparatus 100 may display second indicators on the plurality of the second points 110, 112, 114, 116, 120, 122, 124, and 126, which are different from the first point 118.

The plurality of the second points 110, 112, 114, 116, 120, 122, 124, and 126 may refer to points to which the first point 118 is to be moved based on a user selection.

If the display apparatus 100 enters the screen-editing mode, the display apparatus 100 may determine the plurality of the second points 110, 112, 114, 116, 120, 122, 124, and 126, according to a state where a screen is divided at a point of time when the display apparatus 100 enters the screen-editing mode. In the display apparatus 100, a method of determining the plurality of the second points 110, 112, 114, 116, 120, 122, 124, and 126 according to a state where the screen is divided may be preset. For example, the plurality of the second points 110, 112, 114, 116, 120, 122, 124, and 126 may be a center point of each sub-screen or a center point of boundaries at which 2 sub-screens contact each other.

The display apparatus 100 may display the second indicators at a location of the plurality of the determined second points 110, 112, 114, 116, 120, 122, 124, and 126. In this case, the display apparatus 100 may display the second indicators to be distinguished from the first indicator. The second indicators may be figures in the form of a point. Alternatively, the second indicators may be preset numbers that are different from each other or an identification value of keys on the remote controller 200 which are different from each other. In this case, the second indicators may be displayed in a same array as an array of keys on the remote controller 200.

In operation S240, the display apparatus 100 may receive an input of selecting one of the second indicators.

For example, if the second indicators are formed of a plurality of numbers which are different from each other, the display apparatus 100 may receive an input of selecting one of the plurality of the numbers.

In operation S250, based on the received input, the display apparatus 100 may move a boundary at which the first point 118 is located, so that the first point 118 is located at a second point corresponding to the selected second indicator.

The display apparatus 100 may determine a type of the received input. The type of the received input may refer to a method of pushing a key, which is performed by a user.

For example, the type of the input may include a click, a double click, or a long click, but is not limited thereto. Additionally, the type of the input may vary according to characteristics of the remote controller 200.

If the type of the received input is a first input, for example, a click, the display apparatus 100 may move a boundary of a sub-screen, at which the first point 118 is located, to pass a second point at which the selected second indicator is located. As the boundary of the sub-screen at which the first point 118 is located is moved, the first point 118 may be moved to the second point.

Additionally, the display apparatus 100 may adjust a size of an image displayed on the sub-screen, based on the moved boundary of the sub-screen. For example, the display apparatus 100 may change a size of an image displayed on a sub-screen, according to a rate at which the size of the sub-screen is changed. Additionally, for example, if an image is displayed on a whole sub-screen, the display apparatus 100 may adjust a size of the image so that a boundary of the image matches a boundary of the sub-screen.

Additionally, as the first point is moved, the display apparatus 100 may move the plurality of the second points so that the first point 118 is located at a center of the plurality of the second points. Additionally, the display apparatus 100 may display the second indicators on the plurality of the second points.

If a type of the received input is a second input, for example, a double click, the display apparatus 100 may determine whether a second point corresponding to the second indicator selected by a user are located at the boundary of the plurality of the sub-screens.

If the second point corresponding to the second indicator selected by a user is located at the boundary of the plurality of the sub-screens, the display apparatus 100 may exchange images on sub-screens, which are differentiated from each other according to the boundary at which the second point is located, with each other.

Additionally, if the second point corresponding to the second indicator selected by the user is not located at the boundary of the plurality of the sub-screens, the display apparatus 100 may enlarge the sub-screen, on which the second point is located, to a whole screen of the display apparatus 100. For example, if the second point corresponding to the second indicator selected by the user is located on one of the plurality of the sub-screens, the sub-screen on which the second point is located may be enlarged to the whole screen of the display apparatus 100. Additionally, the display apparatus 100 may receive an input corresponding to the first indicator. As the display apparatus 100 receives an input corresponding to the first indicator, the display apparatus 100 may determine a type of the received input.

If a type of the received input is determined as a first input, the display apparatus 100 may deactivate the screen-editing mode. As the screen-editing mode is deactivated, the display apparatus 100 may delete the first indicator and the second indicators which are displayed on the screen.

If a type of the received input is determined as a second input, the display apparatus 100 may adjust a size of the plurality of the sub-screens so that each size of the plurality of the sub-screens is identical to each other.

Figure 3A:
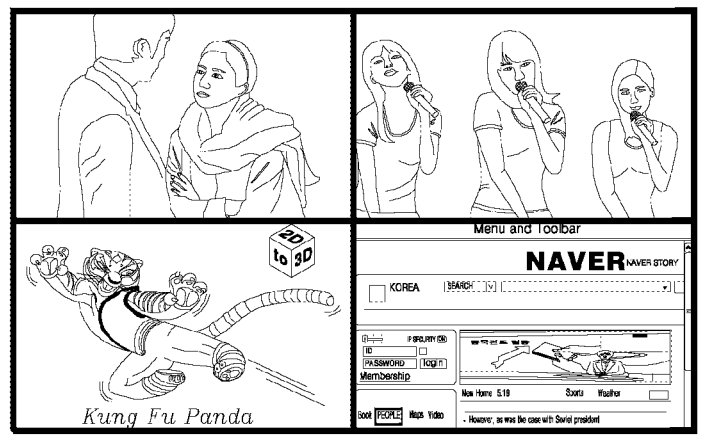
FIGS. 3A, 3B, and 3C illustrate entering a screen-editing mode according to a user selection, which is performed by a display apparatus, according to various embodiments of the present disclosure.
Figure 3A:
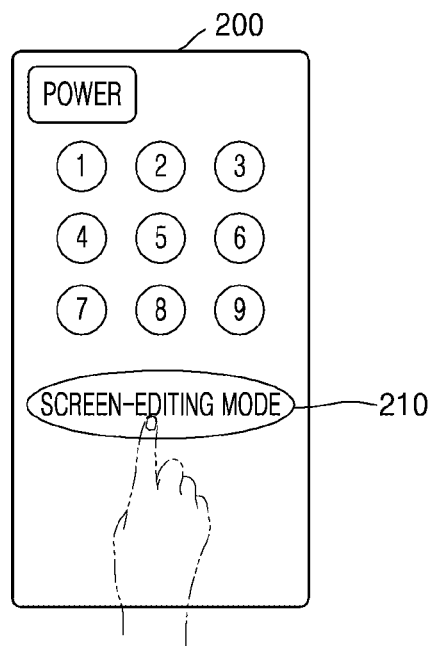
Figure 3B:
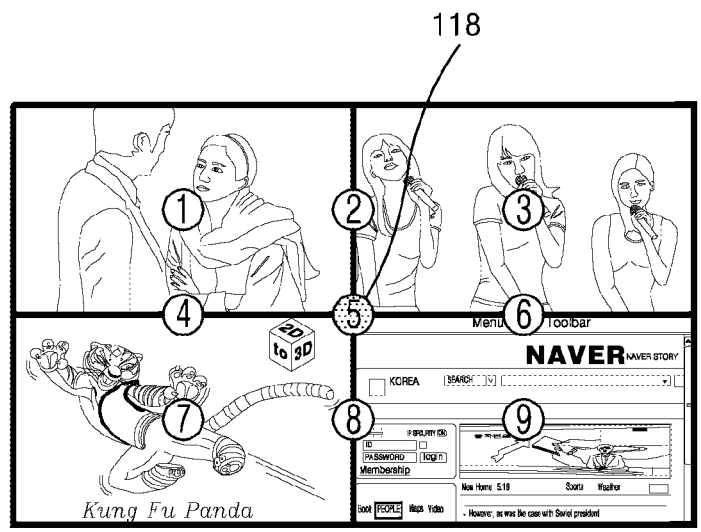
Figure 3B:
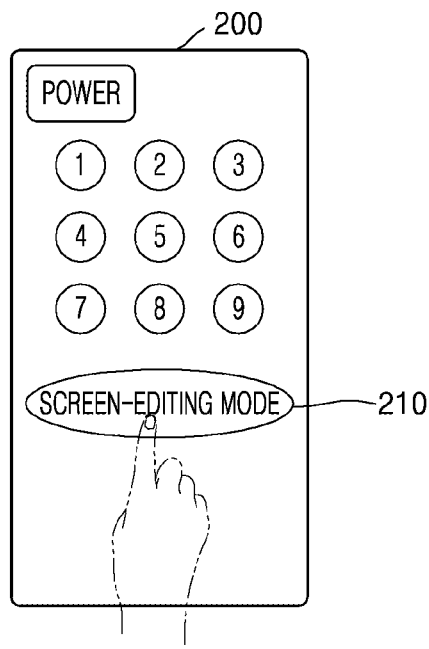
Figure 3C:
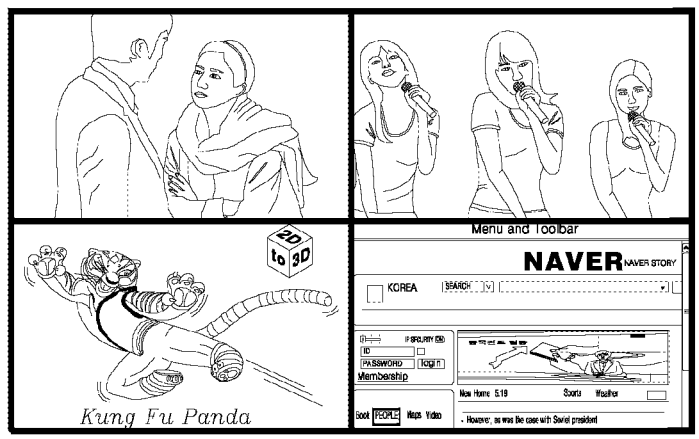

FIGS. 3A, 3B, and 3C illustrate entering a screen-editing mode according to a user selection, which is performed by a display apparatus, according to various embodiments of the present disclosure.

Referring to FIG. 3A, the display apparatus 100 may divide a whole screen of the display apparatus 100 into 4 sub-screens. Additionally, the display apparatus 100 may display each image on each sub-screen obtained by the dividing. Additionally, the display apparatus 100 may receive identification information of the screen-editing mode key 210 from the remote controller 200.

Referring to FIG. 3B, as the display apparatus 100 receives identification information of the screen-editing mode key 210 from the remote controller 200, the display apparatus 100 may enter the screen-editing mode. As the display apparatus 100 enters the screen-editing mode, the display apparatus 100 may display a user interface for changing a size of the plurality of the images displayed on the screen of the display apparatus 100. Additionally, the display apparatus 100 may re-receive identification information of the screen-editing mode key 210 from the remote controller 200 in the screen-editing mode.

Referring to FIG. 3C, as the display apparatus 100 re-receives identification information of the screen-editing mode key 210 from the remote controller 200 in the screen-editing mode, the display apparatus 100 may deactivate the screen-editing mode. As the screen-editing mode is deactivated, the display apparatus 100 may not display on the screen the user interface for changing a size of the plurality of the displayed images.

Instead of receiving the identification value of the screen-editing mode key 210, if the display apparatus 100 receives an identification value of a key corresponding to the first indicator indicating the first point 118 in the screen-editing mode, the display apparatus 100 may deactivate the screen-editing mode. For example, if the display apparatus 100 receives an identification value of a number 5, which is the first indicator, from the remote controller 200, the display apparatus 100 may deactivate the screen-editing mode.

Figure 4A:
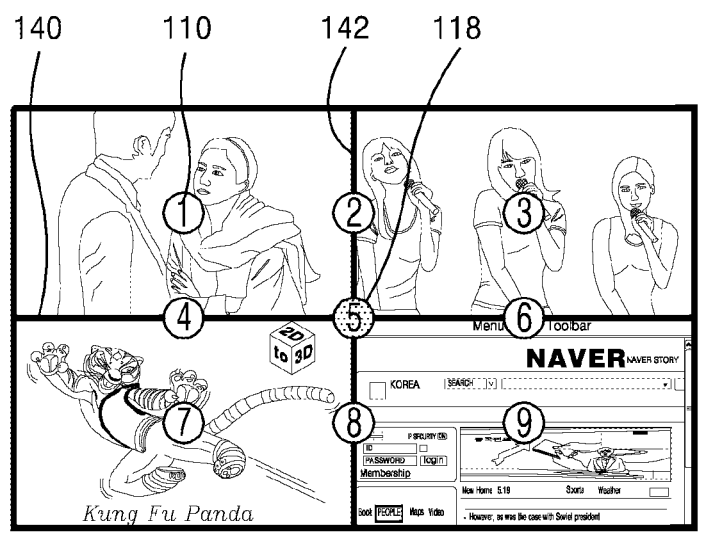
FIGS. 4A, 4B, and 4C illustrate changing a display area of a plurality of images displayed on a screen of a display apparatus by using the remote controller, which is performed by the display apparatus, according to various embodiments of the present disclosure.
Figure 4B:
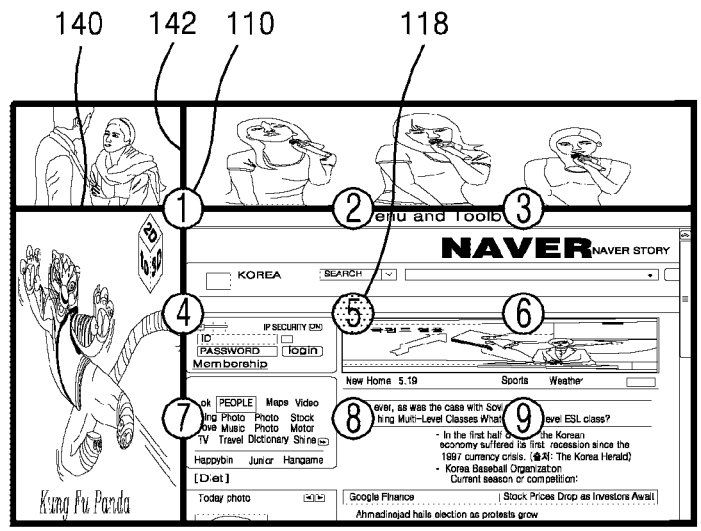
Figure 4B:
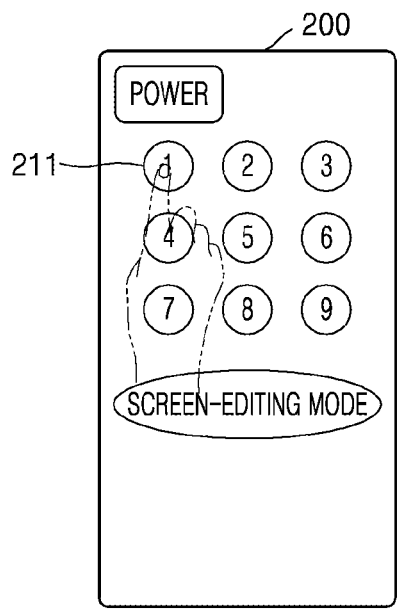
Figure 4C:
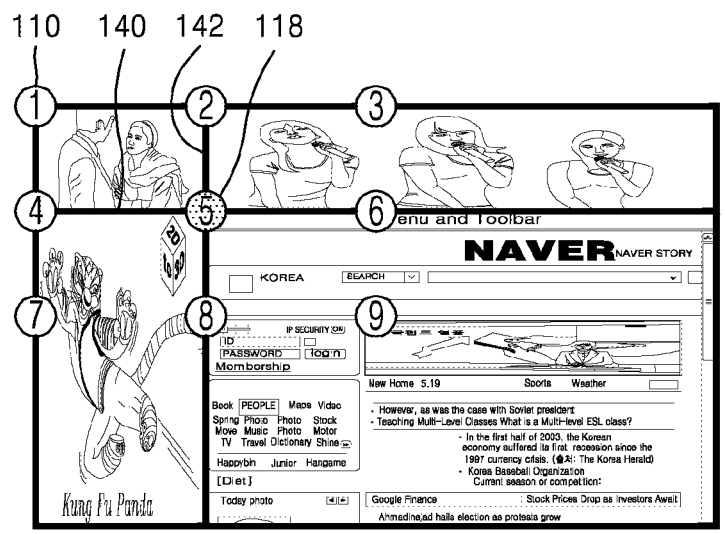

FIGS. 4A, 4B, and 4C illustrate changing a display area of a plurality of images displayed on a screen of a display apparatus by using a remote controller, which is performed by the display apparatus, according to various embodiments of the present disclosure.

Referring to FIG. 4A, in a screen-editing mode, the display apparatus 100 may select a crossing point, at which boundaries of 4 sub-screens cross each other, as a first point 118. Additionally, the display apparatus 100 may display a first indicator on the first point 118. Additionally, the display apparatus 100 may select a plurality of second points so that the first point 118 is located at a center of the plurality of the second points. Additionally, the display apparatus 100 may display second indicators on the plurality of the second points. In this case, the display apparatus 200 may display the second indicators in a same array as an array of number keys on the remote controller 200. Thus, the display apparatus 100 may display numbers 1 to 9 in the same array as the number keys on the remote controller 200.

Referring to FIG. 4B, the display apparatus 100 may receive an identification value of a number 1 key 211 from the remote controller 200. As the display apparatus 100 receives an identification value of the number 1 key 211, the display apparatus 100 may move the boundaries 140 and 142, at which the first point 118 is located, to pass a second point 110 marked with a number 1.

As shown in FIG. 4B, as the boundaries 140 and 142 are moved, the display apparatus 100 may change a display area of an image displayed on each sub-screen. For example, the display apparatus 100 may adjust a display area of images so that a boundary of the images matches a boundary of each sub-screen.

Additionally, as the boundaries 140 and 142 are moved, a crossing point at which the boundaries of 4 sub-screens cross each other may be moved to the second point 110 marked with the number 1. As the crossing point is moved, the display apparatus 100 may determine the second point 110, to which the crossing point is moved, as a new first point.

Referring to FIG. 4C, the display apparatus 100 may display a first indicator on the first point 118 to which the crossing point 110 is changed. Additionally, the display apparatus 100 may change a location of the plurality of the second points. For example, a location of the plurality of the second points may be changed so that the first point 118 to which the crossing point 110 is changed is located at a center of the plurality of the second points. Additionally, the display apparatus 100 may display the second indicators on the plurality of the second points of which location is changed.

Accordingly, if an identification value of the number 1 key is selected from the remote controller 200, an upper-left sub-screen may become smallest, and a lower-right sub-screen may become largest among the sub-screens. Additionally, the first indicator and the second indicators respectively marked with the numbers 1 to 9 at a center of the screen may be moved from a center to an upper-left part of the screen.

Figure 5A:
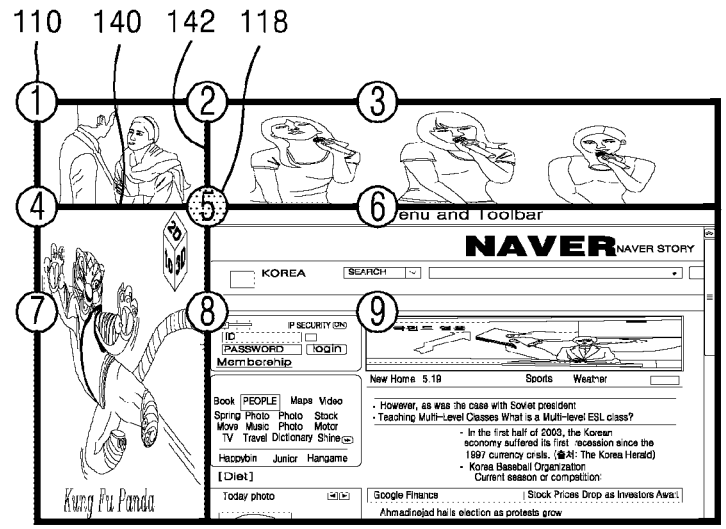
FIGS. 5A and 5B illustrate changing a display area of a plurality of images displayed on a screen of the display apparatus by using the remote controller, which is performed by a display apparatus, according to various embodiments of the present disclosure.
Figure 5A:
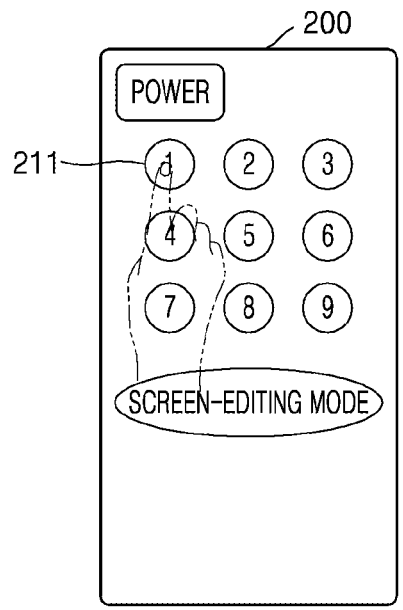
Figure 5B:
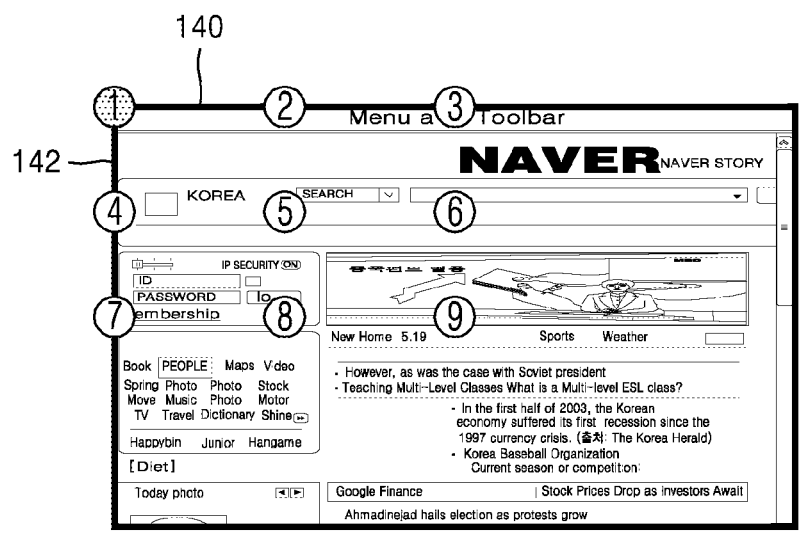

FIGS. 5A and 5B illustrate changing a display area of a plurality of images displayed on a screen of a display apparatus by using a remote controller, which is performed by the display apparatus, according to various embodiments of the present disclosure.

Referring to FIG. 5A, the display apparatus 100 may select the crossing point, at which boundaries of 4 sub-screens cross each other, as a first point 118. Additionally, the display apparatus 100 may display a first indicator on the first point 118. Additionally, the display apparatus 100 may select a plurality of second points so that the first point 118 is located at a center of the plurality of the second points. Additionally, the display apparatus 100 may display second indicators on the plurality of the second points.

The display apparatus 100 may receive an identification value of the number 1 key 211 from the remote controller 200. As the display apparatus 100 receives the identification value of the number 1 key 211, the display apparatus 100 may move the boundaries 140 and 142, at which the first point 118 is located, to pass the second point 110 marked with a number 1.

Referring to FIG. 5B, as the boundaries 140 and 142 at which the first point 118 is located are moved, the display apparatus 100 may change a size of images displayed on an area of the sub-screen and the sub-screen.

As shown in FIG. 5B, if the selected second point 110 is at a corner of the whole screen, the display apparatus 100 may change a sub-screen to the whole screen. Accordingly, the display apparatus 100 may deactivate a screen mode in which several sub-screens are displayed at the same time and output data in a broadcasting channel to the whole screen or execute an application in the whole screen.

Figure 6A:
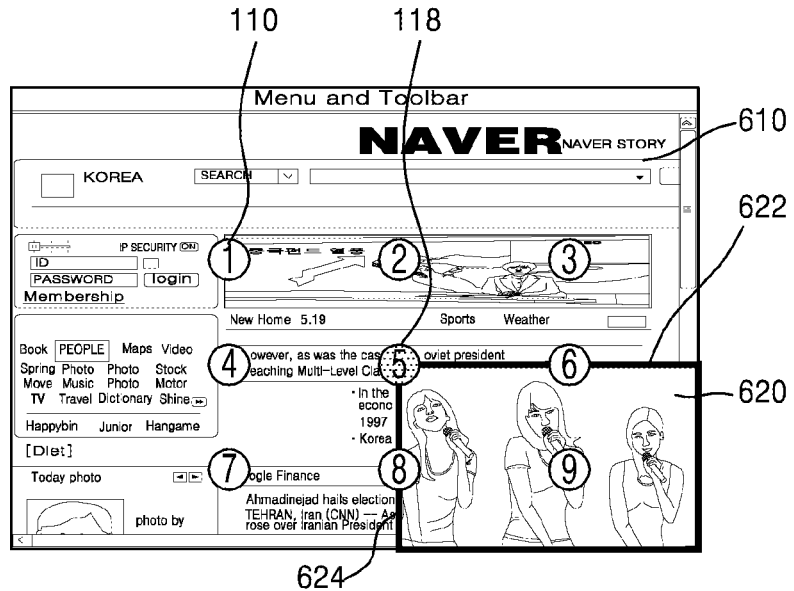
FIGS. 6A and 6B illustrate changing a display area of a plurality of images displayed on a screen of the display apparatus by using the remote controller, which is performed by a display apparatus, according to various embodiments of the present disclosure.
Figure 6A:
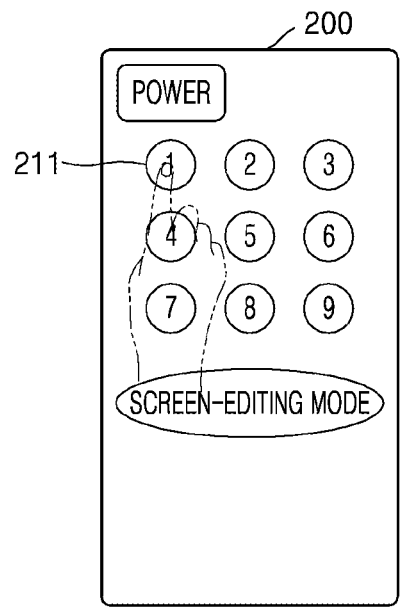
Figure 6B:
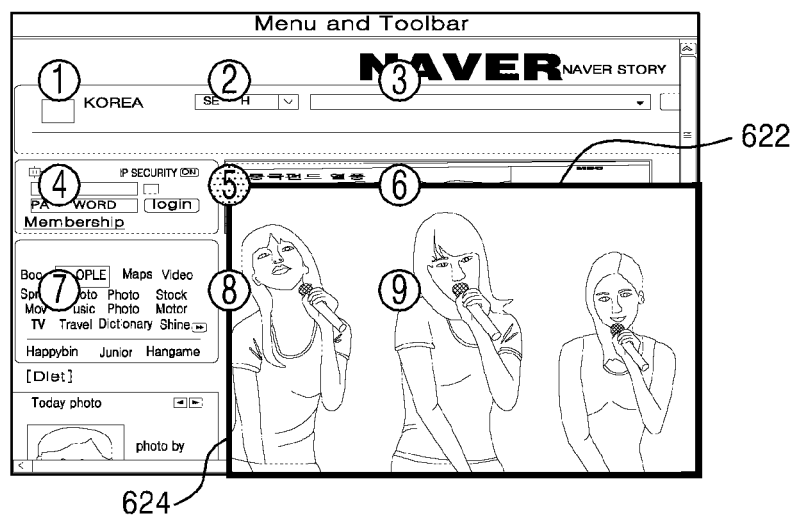

FIGS. 6A and 6B illustrate changing a display area of a plurality of images displayed on a screen of a display apparatus by using a remote controller, which is performed by the display apparatus, according to various embodiments of the present disclosure.

Referring to FIG. 6A, the display apparatus 100 may display an image on a whole screen and, at the same time, set a sub-screen on a part of the whole screen and display another image on the sub-screen. For example, the display apparatus 100 may display an execution image of a web browser on a whole screen 610 and, at the same time, set a sub-screen 620 on a lower-right part of the whole screen 610 and display a news broadcast on the sub-screen 620. In this case, according to various embodiments of the present disclosure, the whole screen 610 may be referred to as a main screen, and the sub-screen 620 may be referred to as an auxiliary screen.

As shown in FIG. 6A, the display apparatus 100 may select a corner of the auxiliary screen as a first point 118. Additionally, the display apparatus 100 may select a plurality of second points so that the first point 118 is located at a center of the plurality of the second points. The display apparatus 100 may display a first indicator indicating the first indicator and second indicators indicating the plurality of the second points.

The display apparatus 100 may receive an identification value of the number 1 key 211 from the remote controller 200. As the display apparatus 100 receives an identification value of the number 1 key 211, the display apparatus 100 may move boundaries 622 and 624 of the auxiliary screen, at which the first point 118 is located, to pass the second point 110 marked with a number 1.

Referring to FIG. 6B, as the boundaries 622 and 624 of the auxiliary screen are moved, a size of the auxiliary screen may be changed. Additionally, as the size of the auxiliary screen is changed, the display apparatus 100 may change a size of an image displayed on the auxiliary screen. For example, the display apparatus 100 may adjust a display area of the displayed image so that a boundary of the image matches a boundary of the auxiliary screen.

Figure 7A:
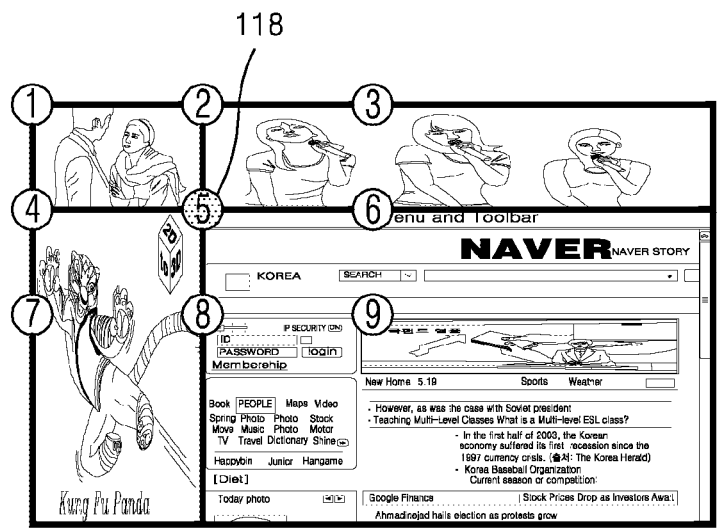
FIGS. 7A and 7B illustrate changing a display area of a plurality of images displayed on a screen of the display apparatus by using the remote controller, which is performed by a display apparatus, according to various embodiments of the present disclosure.
Figure 7A:
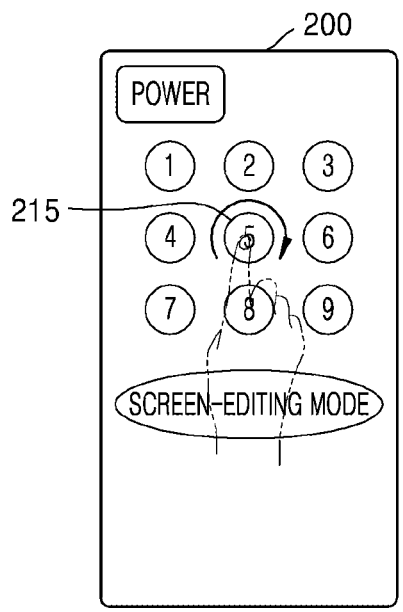
Figure 7B:
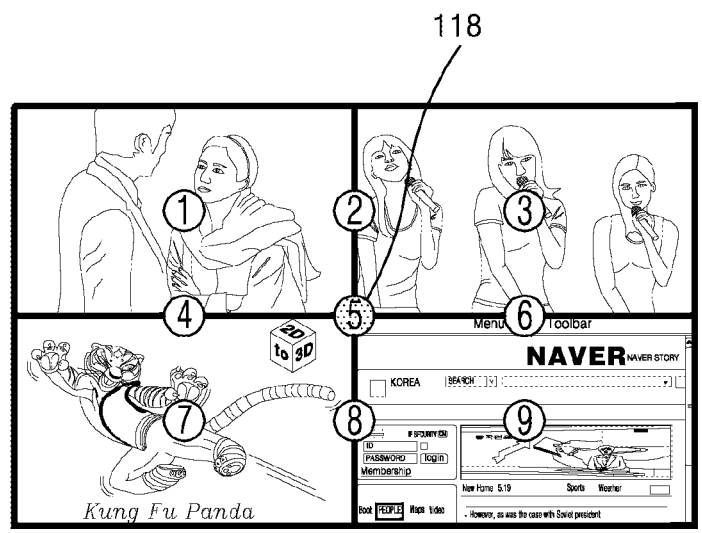

FIGS. 7A and 7B illustrate changing a display area of a plurality of images displayed on a screen of a display apparatus by using a remote controller, which is performed by the display apparatus, according to various embodiments of the present disclosure.

Referring to FIGS. 7A and 7B, the display apparatus 100 may change an area of each sub-screen into an initial mode based on an identification value of a key from the remote controller 200.

The initial mode for adjusting an area of each sub-screen in accordance with predetermined criteria regardless of a location of a first point and second points may be set for the display apparatus 100. For example, the display apparatus 100 may adjust a size of each sub-screen so that sizes of all sub-screens are identical to each other in the initial mode.

As shown in FIG. 7A, the display apparatus 100 may divide a whole screen into sub-screens so that the sub-screens are respectively located in an upper-left part, an upper-right part, a lower-left part, and a lower-right part of the whole screen. The display apparatus 100 may adjust a size of each sub-screen so that a size of the sub-screen in the upper-left part becomes smaller than a size of the other 3 sub-screens.

In the screen-editing mode, the display apparatus 100 may select the crossing point at which boundaries of 4 sub-screens cross each other, as a first point 118. In this case, the first point 118 may be located at the upper-left part of the screen. Then, the display apparatus 100 may select a plurality of second points so that the first point 118 is located at a center of the plurality of the second points. The display apparatus 100 may display a first indicator and second indicators respectively corresponding to the first point 118 and the plurality of the second points.

The display apparatus 200 may receive an identification value of a key predetermined in correspondence with an initial mode from the remote control apparatus 200. In this case, the identification value of the key may include an identification value representing a type of the key, as well as a unique identification value for differentiating a plurality of keys on the remote control apparatus 200 from each other. For example, an identification value of a key predetermined in correspondence with the initial mode may be an identification value of a number 5 key 215 and an identification value representing a long click.

As shown in FIG. 7B, as the display apparatus 100 receives an identification value of a key from the remote controller 200 corresponding to the initial mode, the display apparatus 100 may adjust an area of each sub-screen according to a method in which the display apparatus 100 is set to the initial mode.

In the initial mode, each size of all sub-screens of the display apparatus 100 may be set to be identical to each other. Accordingly, the display apparatus 100 may adjust an area of each sub-screen to have an identical size to each other. Additionally, the display apparatus 100 may adjust a size of images displayed on each sub-screen according to a size of sub-screens corresponding to the images.

Additionally, as a size of each sub-screen is changed, the display apparatus 100 may re-determine a first point and second points. In this case, the display apparatus 100 may determine the crossing point, at which boundaries of 4 sub-screens of which a display area is changed cross each other, as a first point 118. Additionally, the display apparatus 100 may display a first indicator on the first point obtained by the determining. The display apparatus 100 may also determine second points so that the first point is located at a center of the second points, and display the second indicators on the second points obtained by the determining.

Figure 8A:
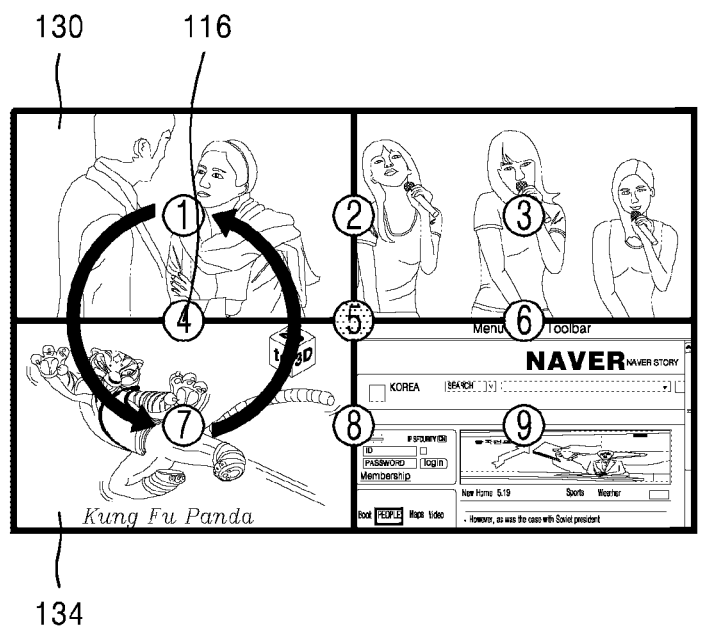
FIGS. 8A and 8B illustrate changing a display area of a plurality of images displayed on a screen of the display apparatus by using the remote controller, which is performed by a display apparatus, according to various embodiments of the present disclosure.
Figure 8A:
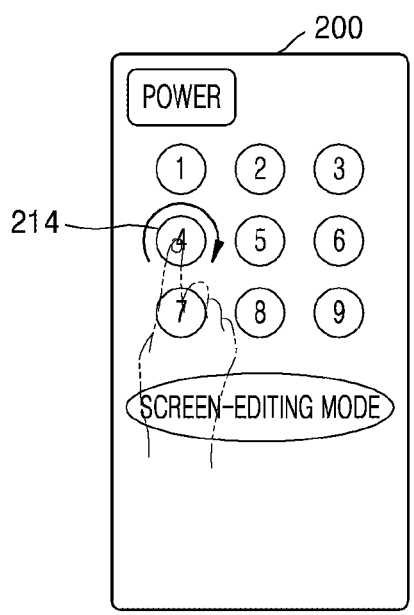
Figure 8B:
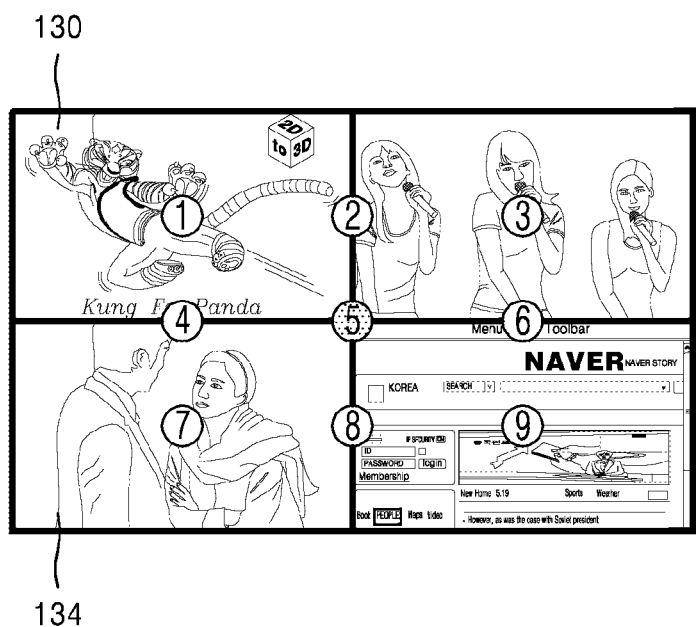

FIGS. 8A and 8B illustrate changing a display area of a plurality of images displayed on a screen of a display apparatus by using a remote controller, which is performed by the display apparatus, according to various embodiments of the present disclosure.

Referring to FIGS. 8A and 8B, the display apparatus 100 may select two sub-screens and change each image displayed on the selected sub-screens with each other.

A method of exchanging images displayed on each sub-screen with each other, based on an identification value of a key on the remote controller 200, may be set for the display apparatus 100. For example, if an identification value of a key indicating an arbitrary second point located at a boundary between two sub-screens is received, an operation of exchanging images, displayed on the two sub-screens separated by a boundary at which the second point is located, with each other may be set for the display apparatus 100

Referring to FIG. 8A, the display apparatus 100 may divide a whole screen into sub-screens so that the sub-screens are located in an upper-left part, an upper-right part, a lower-left part, and a lower-right part of the whole screen. The display apparatus 100 may display each image on each sub-screen. For example, the display apparatus 100 may play a movie on the lower-left sub-screen 134 and display moving images for a soap opera on the upper left sub-screen 130.

The display apparatus 100 may select the crossing point, at which boundaries of 4 sub-screens cross each other, as a first point 118. Additionally, the display apparatus 100 may select a plurality of second points so that the first point 118 is located at a center of the plurality of the second points. The display apparatus 100 may also display a first indicator and second indicators in correspondence with the first point and the plurality of the second points.

The display apparatus 100 may receive from the remote controller 200 an identification value of a key indicating an arbitrary second point located at a boundary between two sub-screens. For example, the display apparatus 100 may receive an identification value of number 2, 4, 6, or 8 keys from the remote controller 200. In this case, an identification value of a key may include an identification value indicating a type of a key, as well as a unique identification value for differentiating a plurality of keys on the remote control apparatus 200 from each other. For example, an identification value of a key, predetermined in correspondence with an operation of exchanging locations of two sub-screens with each other, may be an identification value of a number key and an identification value representing a long click.

As an identification value of a number 4 key 214 and an identification value representing a long click are received, the display apparatus 100 may select the upper-left sub-screen 130 and the lower-left sub-screen 134 which are separated from each other by a boundary where a number 4 is located. Additionally, the display apparatus 100 may exchange images, displayed on the selected upper-left sub-screen 130 and lower-left sub-screen 134, with each other.

Referring to FIG. 8B, as images displayed on the upper-left sub-screen 130 and the lower-left sub-screen 134 are exchanged with each other, the display apparatus 100 may play the movie on the upper-left sub-screen 130 and display the moving images for the soap opera on the lower-left sub-screen 134.

Figure 9A:
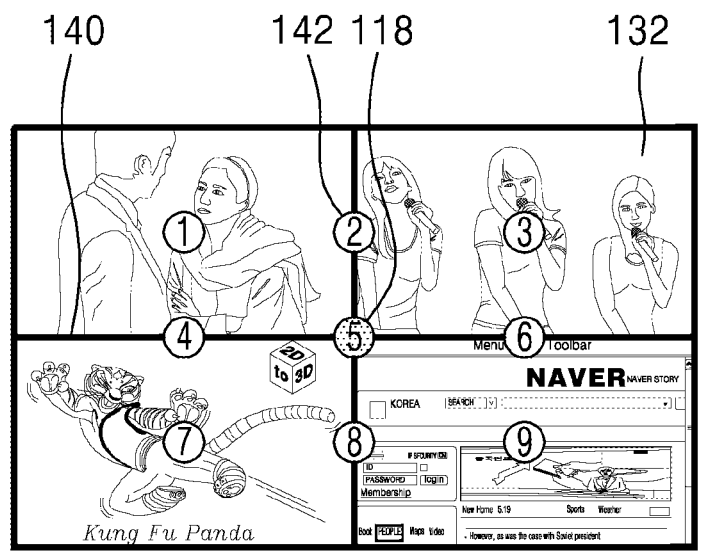
FIGS. 9A and 9B illustrate changing a display area of a plurality of images displayed on a screen of the display apparatus by using the remote controller, which is performed by a display apparatus, according to various embodiments of the present disclosure.
Figure 9A:
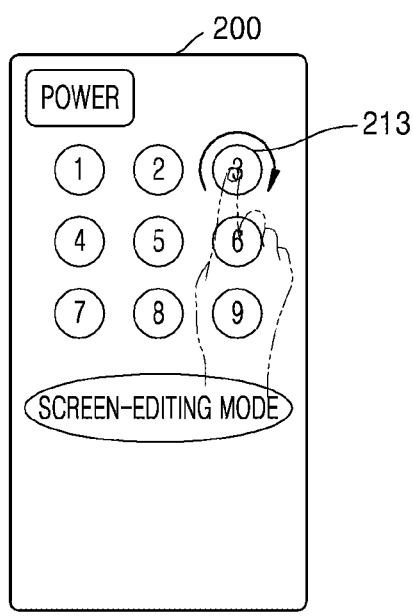
Figure 9B:
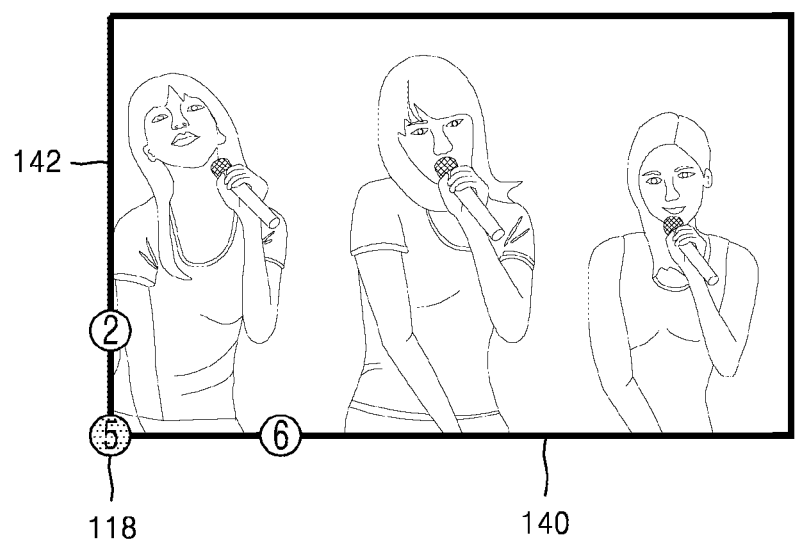

FIGS. 9A and 9B illustrate changing a display area of a plurality of images displayed on a screen of a display apparatus by using a remote controller, which is performed by the display apparatus, according to various embodiments of the present disclosure.

Referring to FIGS. 9A and 9B, the display apparatus 100 may select a sub-screen and change an area of the selected sub-screen to an area of the whole screen.

In the display apparatus 100, a method of enlarging an area of a sub-screen to an area of the whole screen based on an identification value of a key on the remote controller 200 may be set. For example, an operation of changing an area of a sub-screen in which a second point is located to an area of the whole screen, if an identification value of a key indicating the second point located on the sub-screen other than a boundary of the sub-screen is received, may be set for the display apparatus 100.

As shown in FIG. 9A, the display apparatus 100 may divide a whole screen into sub-screens so that the sub-screens are located in an upper-left part, an upper-right part, a lower-left part, and a lower-right part of the whole screen. The display apparatus 100 may display each image on each sub-screen. For example, the display apparatus 100 may display moving images for news on the upper-right sub-screen 132.

The display apparatus 100 may select a first point and a plurality of second points in the screen-editing mode. The display apparatus 100 may display a first indicator and second indicators in correspondence with the first point and the plurality of the second indicators. In this case, the display apparatus 100 may determine a second point on the upper-right sub-screen 132, and display a number 3 as a second indicator indicating the determined second point.

The display apparatus 100 may receive an identification value of a key indicating an arbitrary second point located on a sub-screen from the remote controller 200. For example, the display apparatus 100 may receive an identification value of number 1, 3, 5, or 7 keys from the remote controller 200. In this case, an identification value of a key may include an identification value indicating a type of the key, as well as a unique identification value for differentiating a plurality of keys on the remote control apparatus 200 from each other.

An identification value of the number 3 key 213 and an identification value indicating a long click are received, the display apparatus 100 may select an area of the upper-right sub-screen 132 in which a number 3 is located. Additionally, the display apparatus 100 may change an area of the selected upper-right sub-screen 132 to an area of the whole screen of the display apparatus 100.

As the area of the upper-right sub-screen 132 is changed to the area of the whole screen, one of the 4 sub-screens obtained by dividing the whole screen may be changed to the whole screen.

As the area of the upper-right sub-screen 132 is changed to the area of the whole screen of the display apparatus 100, the display apparatus 100 may enlarge an image to be displayed on the upper-left sub-screen 132 to an image having a size corresponding to the whole screen of the display apparatus 100. Then, the display apparatus 100 may display the enlarged image. Accordingly, as shown in FIG. 9B, the moving images for the news on the upper-left sub-screen 132 may be displayed to have a size corresponding to the whole screen of the display apparatus 100.

Figure 10:
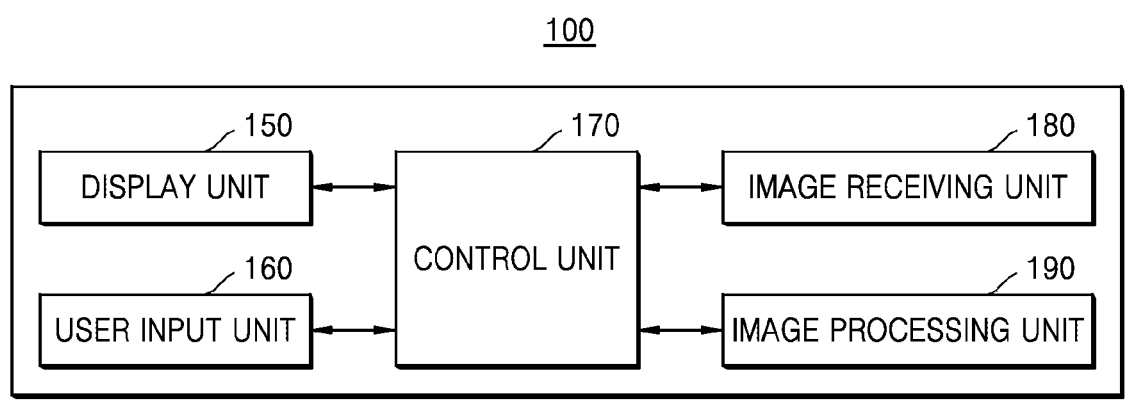
FIG. 10 is a block diagram of a display apparatus according to an embodiment of the present disclosure.

FIG. 10 is a block diagram of a display apparatus according to an embodiment of the present disclosure.

Referring to FIG. 10, the display apparatus 100 may include a display unit 150, a user input unit 160, a control unit 170, an image receiving unit 180, and an image processing unit 190.

The image receiving unit 180 may receive broadcasting via an external network. For example, the image receiving unit 180 may receive a terrestrial broadcasting signal, a cable broadcasting signal, an Internet protocol television (IPTV) broadcasting signal, or a satellite broadcasting signal. Accordingly, the image receiving unit 180 may include a cable TV receiving unit, an IPTV receiving unit, and a satellite broadcasting receiving unit.

Additionally, the image receiving unit 180 may receive an image signal from an external device. For example, the image receiving unit 180 may receive an image signal from a PC, an audio/visual (A/V) apparatus, a smartphone, or a smart pad.

The image processing unit 190 may demodulate a terrestrial broadcasting signal, a cable broadcasting signal, an IPTV broadcasting signal, or a satellite broadcasting signal. Data obtained by demodulating the same may include a compressed image, voice, or additional information. The image processing unit 190 may generate video raw data by decompressing the compressed image according to an MPEGx/H.264 standard. Additionally, the image processing unit 190 may generate audio raw data by decompressing the compressed voice according to an MPEGx/audio compression-3 (AC3)/advanced audio coding (AAC) standard. The image processing unit 190 may transmit the video raw data obtained by the decompressing to the display unit 150.

The communication unit (not illustrated) is a data communication channel for performing data communication, separately from broadcasting content received by the image receiving unit 180, and may perform data communication with an external server via a communication network.

The display unit 150 may be controlled by the control unit 170 to display information processed by the display apparatus 100.

Additionally, the display unit 150 may display the video raw data obtained by the decompressing which is performed by the image processing unit 190. For example, the display unit 150 may display a terrestrial broadcasting image, a cable broadcasting image, a cable broadcasting image, an IPTV broadcasting image, or a satellite broadcasting image. Additionally, the display unit 150 may display an execution image of an application executed by the control unit 170.

If the display unit 150 and a touch pad form a layered structure to constitute a touchscreen, the display unit 150 may be also used as an input device as well as an output unit. The display unit 150 may include at least one selected from the group consisting of a liquid crystal display (LCD), a thin-film transistor-LCD (TFT-LCD), an organic light-emitting diode (OLED), a flexible display, a 3-dimensional (3D) display, and an electrophoretic display. According to an implementation type of the display apparatus 100, the display apparatus 100 may include two or more display units 150.

The user input unit 160 is a unit for inputting data so that the user may control the display apparatus 100.

Additionally, the user input unit 160 may include the remote controller 200 that is separate from the display apparatus 100. In this case, the user input unit 160 may include a short-range communication unit (not illustrated) for wireless communication with the remote controller 200.

The user input unit 160 may include a key pad, a dome switch, a touch pad, which may be a capacitive overlay type, a resistive overlay type, an infrared beam type, a surface acoustic wave type, an integral strain gauge type, or a piezo electric type, a jog wheel, or a jog switch, but is not limited thereto.

The control unit 170 generally controls all operations of the display apparatus 100. For example, the control unit 170 may execute programs stored in a storage unit (not illustrated) so as to control the display unit 150, the user input unit 160, the image receiving unit 180, and the image processing unit 190.

The control unit 170 may divide a whole screen into a plurality of sub-screens, based on a user input. The image receiving unit 180 may receive video or audio data from a plurality of broadcasting channels. The image processing unit 190 may decode a plurality of pieces of received broadcasting data. Additionally, the control unit 170 may output the broadcasting data decoded by the image processing unit 190 to each sub-screen via the display unit 150.

Additionally, the control unit 170 may enter a screen-editing mode for changing a display area of a plurality of images, based on a user input received from the user input unit 160. For example, if receiving identification information of a key for entering the screen-editing mode from the remote controller 200, the control unit 170 may enter the screen-editing mode.

As the display apparatus 100 enters the screen-editing mode, the display apparatus 100 may display a first indicator indicating a first point on the screen via the display unit 150.

If the control unit 170 enters the screen-editing mode, the display apparatus 100 may select a first point, according to a state where a screen is divided at a point of time when the display apparatus 100 enters the screen-editing mode. A method of selecting the first point according to a state where a screen is divided may be preset for the display apparatus 100.

As the first point is selected, the control unit 170 may display the first indicator on a location of the first point 118. A form of the first indicator may be preset for the display apparatus 100. For example, the first indicator may be a preset number or one of respective identification values of keys on the remote controller 200, but is not limited thereto.

If the control unit 170 enters the screen-editing mode, the control unit 170 may select a plurality of second points, according to a state where a screen is divided at the point of time when the control unit 170 enters the screen-editing mode. A method of selecting the plurality of the second points according to a state where the screen is divided may be preset for the display apparatus 100.

The control unit 170 may display second indicators on a location of the plurality of the selected second points via the display unit 150. The second indicators may be preset numbers that are different from each other, or respective identification values of keys on the remote controller 200 which are different from each other. In this case, the second indicators may be displayed in a same array as an array of keys on the remote controller 200.

The control unit 170 may receive an input of selecting one of the second indicators via the user input unit 160. For example, if the second indicators are formed of a plurality of numbers which are different from each other, the user input unit 160 may receive an input of selecting one of the plurality of the numbers.

The control unit 170 may move a boundary, at which the first point is located, so that the first point is located at a second point that corresponds to the selected second indicator.

For example, the control unit 170 may move a boundary of a sub-screen, at which the first point is located, so that the first point passes a second point at which the selected second indicator is located. As the boundary of the sub-screen at which the first point 118 is located is moved, the first point may be moved to the second point.

Additionally, the control unit 170 may adjust a size of an image displayed on the sub-screen, based on the moved boundary of the sub-screen. For example, the control unit 170 may change a size of an image displayed on the sub-screen, according to a rate at which the size of the sub-screen is changed.

Additionally, as the first point is moved, the control unit 170 may move the plurality of the second points so that the moved first point is located at a center of the plurality of the second points. Additionally, the control unit 170 may display the second indicators on the moved plurality of second points via the display unit 150.

Although not illustrated, the display apparatus 100 may include the storage unit (not illustrated). The storage unit (not illustrated) may store a program for processing and controlling the controller 120. The storage unit may include at least one storage medium selected from the group consisting of a flash memory, a hard disk, a multimedia card micro, a card-type memory such as a secure digital (SD) or extreme digital (XD) memory, a random access memory (RAM), a static RAM (SRAM), a read-only memory (ROM), an electrically erasable programmable ROM (EEPROM), a PROM, a magnetic memory, a magnetic disc, and an optical disc. Additionally, the display apparatus 100 may operate a web storage or a cloud server for performing a storage function of the storage unit on the Internet.

Additionally, although not illustrated, the display apparatus 100 may include a sound output unit (not illustrated). The sound output unit (not illustrated) may output audio data received from the image processing unit 190. Additionally, the sound output unit (not illustrated) may output audio data received from the communication unit (not illustrated) or stored in the storage unit (not illustrated).

In addition, other embodiments of the present disclosure can also be implemented through computer-readable code/instructions in/on a medium, e.g., a computer-readable medium, to control at least one processing element to implement any above-described embodiment of the present disclosure. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., compact disc ROMs (CD-ROMs), or digital versatile discs (DVDs)), and transmission media such as Internet transmission media. Thus, the medium may be such a defined and measurable structure including or carrying a signal or information, such as a device carrying a bitstream according to one or more embodiments of the present disclosure. The media may also be a distributed network, so that the computer-readable code is stored/transferred and executed in a distributed fashion. Furthermore, the processing element could include a processor or a computer processor, and processing elements may be distributed and/or included in a single device.

It should be understood that the various embodiments described therein should be considered in a descriptive sense only and not for purposes of limitation. Descriptions of features or aspects within each embodiment of the present disclosure should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image display method comprising:
   displaying a plurality of images on a screen that includes a plurality of sub-screens;
   displaying a first indicator indicating a first point located at a boundary of the plurality of the sub-screens;
   displaying second indicators on a plurality of second points which are different from the first point;
   receiving an input selecting one of the second indicators; and
   moving a boundary at which the first point is located, so that the first point is located at a second point corresponding to the selected second indicator.

2. The image display method of claim 1, further comprising adjusting a size of the plurality of the images, based on the moved boundary.

3. The image display method of claim 1, further comprising:
   changing positions of the plurality of the second points, based on a position of the first point located at the moved boundary; and
   displaying the second indicators on the plurality of the changed second points.

4. The image display method of claim 1, wherein the second indicators are numbers which are different from each other and indicate the plurality of the second points.

5. The image display method of claim 4, wherein the displaying of the second indicators comprises displaying the numbers which are different from each other, in a same array as an array of number keys on a remote controller, and
   the receiving of the input selecting one of the second indicators comprises receiving a number from the remote controller.

6. The image display method of claim 4, wherein the first point includes a crossing point at which boundaries of the plurality of the sub-screens cross each other.

7. The image display method of claim 1, further comprising:
   receiving an input selecting the first indicator;
   determining a type of the received input; and
   deleting the first indicator and the second indicators which are displayed on the screen, based on the type of the received input.

8. The image display method of claim 1, further comprising:
   receiving an input selecting the first indicator;
   determining a type of the received input; and
   adjusting a size of the plurality of the sub-screens based on the type of the received input, so that sizes of each of the plurality of the sub-screens are identical to each other.

9. A display apparatus comprising:
   a display unit configured to display a plurality of images on a screen that includes a plurality of sub-screens, display a first indicator indicating a first point located at a boundary of the plurality of the sub-screens, and display second indicators on a plurality of second points which are different from the first point;
   an input unit configured to receive an input of selecting one of the second indicators; and a control unit configured to move a boundary at which the first point is located, so that the first point is located at a second point corresponding to the selected second indicator.

10. The display apparatus of claim 9, wherein the control unit is further configured to adjust a size of the plurality of the images, based on the moved boundary.

11. The display apparatus of claim 9, wherein the control unit is further configured to change positions of the plurality of the second points, based on a position of the first point located at the moved boundary and display the second indicators on the plurality of the changed second points.

12. The display apparatus of claim 9, wherein the second indicators are numbers which are different from each other and indicate the plurality of the second points.

13. The display apparatus of claim 12, wherein the display unit is further configured to display the second indicators, and display the numbers which are different from each other, in a same array as an array of number keys on a remote controller, and the input unit is further configured to receive an input selecting one of the second indicators, and receive a number from the remote controller.

14. The display apparatus of claim 9, wherein the first point includes a crossing point at which boundaries of the plurality of the sub-screens cross each other.

15. The display apparatus of claim 9, wherein the input unit is further configured to receive an input corresponding to the first indicator, the control unit is further configured to determine a type of the received input, and the display unit is further configured to delete the first indicator and the second indicators which are displayed on the screen, based on the type of the received input.

16. The display apparatus of claim 9, wherein the input unit is further configured to receives an input corresponding to the first indicator, the control unit is further configured to determine a type of the received input, and the display unit is further configured to adjust a size of the plurality of the sub-screens based on the type of the received input, so that sizes of the plurality of the sub-screens are identical to each other.

17. A display apparatus comprising:

a display unit configured to display a plurality of images on a screen that includes a plurality of sub-screens, and display a plurality of indicators on a plurality of points on the screen;

a user input unit configured to receive an input of selecting one of the plurality of the indicators; and a control unit configured to determine a location of a point corresponding to the selected indicator, and exchange each image displayed on the plurality of the sub-screens with each other or enlarge one of the plurality of the sub-screens to the whole screen, selectively based on the location of the point corresponding to the selected indicator.

18. The display apparatus of claim 17, wherein, if a point corresponding to the selected indicator is located at a boundary of the plurality of the sub-screens, the control unit is further configured to exchange images, displayed on sub-screens that are differentiated by the boundary at which the point corresponding to the selected indicator is located, with each other.

19. The display apparatus of claim 17, wherein, if a point corresponding to the selected indicator is located in one of the plurality of the sub-screens, the control unit is further configured to enlarge the sub-screen in which the point corresponding to the selected indicator is located to the whole screen.

20. A non-transitory computer-readable recording storage medium having stored thereon a computer program, which when executed by a computer, performs the method of claim 1.

* * * * *